United States Patent
Gille et al.

(10) Patent No.: US 9,341,149 B2
(45) Date of Patent: May 17, 2016

(54) DEVICE FOR CHANNELING A FLOW OF FEED GAS FOR AN INTERNAL COMBUSTION ENGINE

(75) Inventors: Gerard Gille, Thorigne-en-Charnie (FR); Patrick Boisselle, Laval (FR); Didier Pottier, L'Huisserie (FR)

(73) Assignee: VALEO SYSTEMES THERMIQUES, Le Mesnil Sait Denis (FR)

( * ) Notice: Subject to any disclaimer, the term of this patent is extended or adjusted under 35 U.S.C. 154(b) by 239 days.

(21) Appl. No.: 13/992,260

(22) PCT Filed: Dec. 6, 2011

(86) PCT No.: PCT/EP2011/071870
§ 371 (c)(1),
(2), (4) Date: Aug. 6, 2013

(87) PCT Pub. No.: WO2012/076503
PCT Pub. Date: Jun. 14, 2012

(65) Prior Publication Data
US 2013/0306038 A1    Nov. 21, 2013

(30) Foreign Application Priority Data

Dec. 10, 2010   (FR) ..................... 10 60353

(51) Int. Cl.
*F02M 31/20*    (2006.01)
*F02B 29/04*    (2006.01)
(Continued)

(52) U.S. Cl.
CPC ............ *F02M 31/20* (2013.01); *F02B 29/0475* (2013.01); *F02B 31/04* (2013.01);
(Continued)

(58) Field of Classification Search
CPC .. F02B 29/04; F02B 29/0406; F02B 29/0437; F02B 31/04; F02B 29/0493; F02M 31/20; F02M 35/10; F02M 35/10006; F02M 35/10091; F02M 35/10242; F02M 35/10262; F02M 35/104

USPC ................ 123/540, 542, 184.21; 165/51, 75; 180/68.3
See application file for complete search history.

(56) References Cited

U.S. PATENT DOCUMENTS 4,593,749 A * 6/1986 Schatz .......................... 165/283
4,989,552 A * 2/1991 Obermayer et al. ....... 123/41.66
(Continued)

FOREIGN PATENT DOCUMENTS

DE    102004049027 A1    4/2006
DE    102008047079 A1    3/2010
DE    202009001782 U1    8/2010

OTHER PUBLICATIONS

English language abstract and translation for DE 102004049027 extracted from espacenet.com database on Oct. 28, 2013, 14 pages.
(Continued)

*Primary Examiner* — Grant Moubry
(74) *Attorney, Agent, or Firm* — Howard & Howard Attorneys PLLC

(57) ABSTRACT

The invention relates to a device (6) for channeling a stream of feed gas for an internal combustion engine, said device (6) being able to be installed at least facing an exchanger (7) for the thermal conditioning of the stream of gas, the device comprises a first canal (15), referred to as central canal, for the circulation of the stream of gas, delimited by a first part (19) of a wall (17) and intended to channel the stream of gas toward a first zone (20) of a face (40) of the exchanger (7), said device comprising at least one second canal (16), referred to as lateral canal, for the circulation of the stream of gas, delimited by a second part (27) of the wall (17) and intended to channel the stream of gas toward a second zone (28) of said face (40) of the exchanger (7). The invention also relates to an intake airbox of an internal combustion engine and to an air inlet box of said airbox equipped with such a device. It further relates to an air intake module of an internal combustion engine comprising such an airbox.

16 Claims, 3 Drawing Sheets

(51) Int. Cl.
*F02B 31/04* (2006.01)
*F02M 35/10* (2006.01)
*F02B 27/00* (2006.01)

(52) U.S. Cl.
CPC ... *F02M35/10045* (2013.01); *F02M 35/10052* (2013.01); *F02M 35/10124* (2013.01); *F02M 35/10131* (2013.01); *F02M 35/10288* (2013.01); *F02B 27/00* (2013.01); *Y02T 10/146* (2013.01)

(56) References Cited

U.S. PATENT DOCUMENTS

| | | | | |
|---|---|---|---|---|
| 5,152,144 | A * | 10/1992 | Andrie | 60/599 |
| 6,311,678 | B1 * | 11/2001 | Lepoutre | 123/568.12 |
| 7,213,639 | B2 * | 5/2007 | Danielsson et al. | 165/159 |
| 7,743,816 | B2 * | 6/2010 | Mercz et al. | 165/11.1 |
| 8,225,849 | B2 * | 7/2012 | Hendrix | 165/101 |
| 8,225,852 | B2 * | 7/2012 | Wu et al. | 165/140 |
| 8,656,894 | B2 * | 2/2014 | Leroux et al. | 123/540 |
| 8,985,198 | B2 * | 3/2015 | Braun et al. | 165/153 |
| 2003/0079707 | A1 | 5/2003 | Brassell et al. | |
| 2007/0175456 | A1 | 8/2007 | Tally | |
| 2008/0087410 | A1 * | 4/2008 | Muller-Lufft et al. | 165/165 |
| 2010/0199663 | A1 | 8/2010 | Marimbordes et al. | |
| 2014/0109857 | A1 * | 4/2014 | Vallee et al. | 123/184.21 |

OTHER PUBLICATIONS

English language abstract and translation for DE 102008047079 extracted from espacenet.com database on Oct. 28, 2013, 22 pages.
English language abstract not found for DE 202009001782. However see English language equivalent US 2010/0199663. Original document extracted from espacenet.com database on Oct. 28, 2013, 7 pages.
International Search Report for Application No. PCT/EP2011/071870 dated Feb. 24, 2012, 7 pages.

* cited by examiner

DEVICE FOR CHANNELING A FLOW OF FEED GAS FOR AN INTERNAL COMBUSTION ENGINE

RELATED APPLICATIONS

This application is the National Stage of International Patent Application No. PCT/EP2011/071870, filed on Dec. 6, 2011, which claims priority to and all the advantages of French Patent Application No. FR 10/60353, filed on Dec. 10, 2010, the content of which is incorporated herein by reference.

The invention relates to a device for channeling a stream of feed gas of an internal combustion engine, to an intake airbox of an internal combustion engine and to an air inlet box of said intake airbox, all equipped with such a channeling device. The word gas should be understood as meaning air or a mixture of air and exhaust gases.

BACKGROUND

The invention will find an application in particular as a gas intake device, for admitting said gases to the cylinder head of a motor vehicle internal combustion engine.

A motor vehicle internal combustion engine comprises a plurality of combustion chambers each delimited by a piston, a cylinder, and a portion of a cylinder head. These combustion chambers receive a mixture of oxidant and of fuel which are supposed to be burnt in order to generate the work provided by the engine. The oxidant contains air, which may or may not be compressed, depending on whether or not the engine is fitted with a turbocharger. The air may moreover be mixed with exhaust gases; these are then referred to as recirculated exhaust gases. The gases admitted to the combustion chamber will hereinafter be referred to as feed gases.

It is known practice to increase the density of these feed gases by cooling them, for example by encouraging exchange of heat between the feed gases and a stream of air external to the vehicle, using an air/air heat exchanger.

It is also known practice to perform this cooling by exchange of heat between the feed gases and a liquid fluid circulating through a heat exchanger through which the feed gases pass. The effectiveness of such a solution is dependent on the use of all the frontal surface area of the heat exchanger core and on the quantity of feed gases being distributed across the entirety of this surface area.

Unfortunately, the space available in the vehicle compartment containing the internal combustion engine is limited. It is difficult to design airboxes or ducts capable of supplying the entire surface area of the heat exchanger uniformly, particularly when the stream of feed gas is parallel to the plane of the surface of the heat exchanger that receives this stream. Further, the inlet surface area of the airbox is generally markedly lower than the surface area of the exchanger receiving the stream of feed gas.

Adding a deflector in the duct improves the situation but the deflector leads to undesirable pressure drops. Moreover, this deflector is an additional component that has to be added to and fixed into an intake airbox admitting the feed gases, making that airbox more complicated to produce.

It is an object of the present invention to resolve the disadvantages described hereinabove chiefly by creating a feed gas inlet airbox cover, otherwise known as intake airbox, which delimits at least two ducts for channeling these gases in distinct zones of the frontal surface of the exchanger.

SUMMARY OF THE INVENTION

One subject of the invention is therefore a device for channeling a stream of intake air, or feed gas for an internal combustion engine, said device being able to be installed at least facing an exchanger for the thermal conditioning of the stream of gas. The device comprises a first canal, referred to as central canal, for the circulation of the stream of gas, delimited by a first part of a wall and intended to channel the stream of gas toward a first zone of a face of the exchanger, said device comprising at least one second canal, referred to as lateral canal, for the circulation of the stream of gas, delimited by a second part of the wall and intended to channel the stream of gas toward a second zone of said face of the exchanger.

The wall here forms a constituent part of the device and it will be appreciated that this wall has a deformation extending over a width that is less than the total width of the wall, this deformation being bordered laterally by at least one duct through which part of the stream of feed gas circulates.

According to a first feature of the invention, the first part and the second part are configured to alter the direction of the stream of gas, said first part or deformation having a profile that differs from that of the second part in the direction of travel of the stream of gas with respect to the device. This then guarantees that the stream of feed gas is sent to two distinct zones of the face of the exchanger.

According to a second feature of the invention, the central canal and the lateral canal run side by side, at least in part. It will be understood here that these canals both run longitudinally and that they are installed immediately next to one another.

According to another feature of the invention, the device comprises a feed gas stream outlet section, and the first part of the wall is formed by a first curved zone with its concave side facing toward the outlet section and by a second curved zone, situated in the continuation of the first zone in the direction in which the stream of air is directed, said second curved zone having its convex side facing toward said outlet section. It will be understood here that the deformation is achieved through the curvature of the first and second zones.

The outlet section for the stream of feed gas is defined, for example, by the wall of the device, which is designed to end in an edge which may delimit both an inlet section and the outlet section for the stream of feed gas.

According to yet another feature of the invention, at least one portion of the outlet section extends in one plane and said first part of the wall comprises a third zone which extends in a plane parallel to the plane of the planar portion of the outlet section, in the continuation of the second zone in the direction in which the stream of air is directed.

According to yet another feature of the invention, the plane of the third zone coincides with the plane of the planar portion of the outlet section.

The first, second and/or third zones of the first part may be adjacent.

The second part of the wall has a first curved surface with its concave side facing toward the outlet section, said first curved surface and said first and second curved zones being side by side, namely immediately adjacent to one another.

Advantageously, the second part of the wall has a second curved surface situated in the continuation of the first curved surface in the direction in which the stream of air flows and which has its convex side facing toward the outlet section, said second curved surface and said third zone being side by side, namely immediately adjacent to one another.

The first and second surfaces of the second part may be adjacent.

Again advantageously, the lateral canal is delimited by a first side ending in the edge of the wall of the device, by a bottom and by a second side bordering the first, second and third zones, the first side, the bottom and the second side making up the wall.

The device mentioned hereinabove may further comprise a third canal for the circulation of the stream of gas and delimited by a third part of the wall, distinct from the first part and from the second part of the wall.

In such a situation, the central canal extends between the lateral canal and the third canal. The third canal may have a profile identical to that of the lateral canal.

Advantageously, the first part and the second part together form said wall. What is more, the third part may also be produced together with the first part and the second part so as to form a one-piece wall, possibly the result of one and the same manufacturing operation in one and the same material.

The invention also relates to an air inlet box of an intake airbox of an internal combustion engine, comprising a channeling device as described above.

According to one embodiment, this may be a box intended to be attached to a body of the airbox, said body being able to accept the exchanger.

The invention also covers an intake airbox of an internal combustion engine able to accept an exchanger for thermally conditioning a stream of feed gas circulating through the airbox, said airbox comprising a device for channeling said stream of gas according to any one of the features described hereinabove.

In one embodiment, the airbox comprises a portion formed as an integral part of said body, said portion having an opening which is closed by said channeling device.

The invention also relates to an air intake module of an internal combustion engine comprising an airbox as described above and a heat exchanger, provided inside said airbox.

A very first advantage according to the invention lies in the possibility of supplying feed gas uniformly across the entire surface area of the exchanger. The invention thus allows the exchanger to be used in a balanced manner. The cooling of the stream of feed gas thus becomes more uniform, avoiding the creation of hot spots which would be detrimental to the balanced filling of the combustion chambers of the combustion engine. The overall efficiency of the exchanger is thus improved.

Another advantage lies in the simplicity of the design of such a device, this device using no attached parts to direct the stream of feed gas to various distinct zones of the surface area of the heat exchanger.

BRIEF DESCRIPTION OF THE DRAWINGS

Further features, details and advantages of the invention will become more clearly apparent from reading the description given hereinafter by way of indication in relation to the drawings in which.

DETAILED DESCRIPTION

Figure 1:
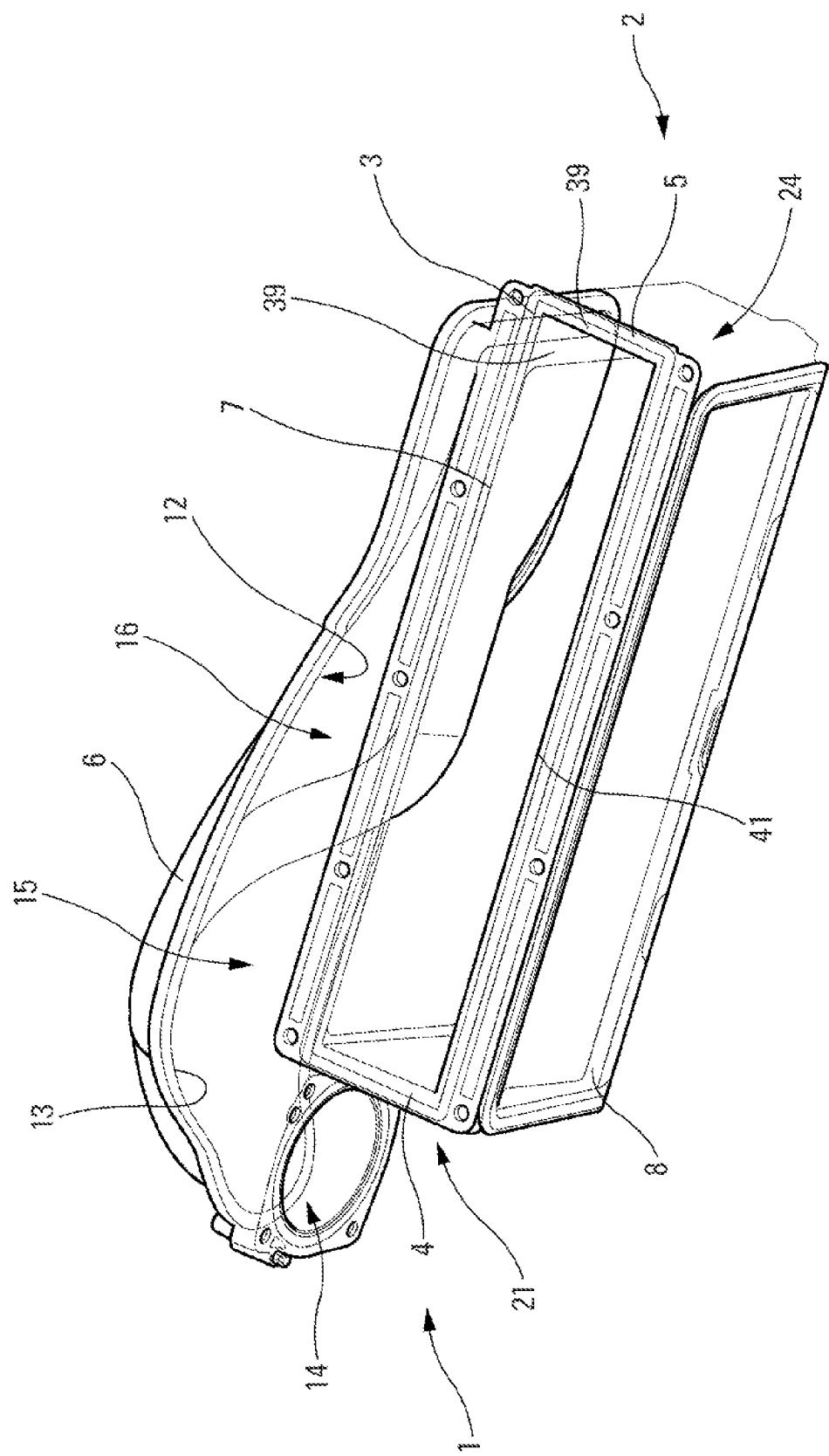
FIG. 1 is a perspective view of an intake airbox for admitting a stream of feed gas, on which the device according to the invention is mounted.

FIG. 1 illustrates an intake airbox 1 intended to be fitted to a vehicle internal combustion engine. This airbox accepts one embodiment of a device 6 for channeling a stream of feed gas for this engine. In this figure, the airbox is depicted to show hidden detail and only its sharp edges are visible, whereas the channeling device is depicted as opaque. The transparent nature of the airbox reveals the structure of this device, particularly the shape of the wall facing toward the inside of the airbox 1, this shape here being a deformation.

This airbox 1 comprises, for example, a body 2, an air inlet box and an air outlet box, which has not been depicted.

The body 2 is designed to be able to accept an exchanger 7, here illustrated in the form of a transparent parallelepiped. The body 2 has an overall shape for example of a hollow parallelepiped. The hollow part of the body 2 forms a housing 3 accessible via an opening 4 delimited by a rim 5. The heat exchanger 7 is installed in the housing 3. The thermal conditioning exchanger 7 comprises four peripheral edges 39 which delimit a heat exchanger core through which the stream of feed gases for cooling passes. This core is therefore delimited by two faces, a first face 40 facing toward the device according to the invention, while a second face 41 is on the opposite side of the core to the first face 40.

This exchanger 7 is, for example, inserted in a translational movement through the opening 8 and may close off this opening using suitable means, for example an end face of its core bundle.

This heat exchanger 7 thermally conditions a stream of feed gas passing through it. This stream of gas feeds the internal combustion of the engine and it is advantageous to increase the density of this stream by cooling it, this function being performed by the heat exchanger 7.

This heat exchanger 7 is an air/liquid exchanger, namely an exchanger capable of transferring heat energy present in the stream of feed gas to a coolant fluid circulating through canals formed in the exchanger. This coolant is, for example, water to which glycol has been added.

It may be a heat exchanger having a core made up of a stack of plates which in alternation define gaps for the circulation of a first fluid, for example air, and gaps for the circulation of a second fluid, for example liquid. The gaps communicate with one another for the circulation of the second fluid. The circulation gaps for the first fluid communicate with the inlet/outlet faces 40, 41 of the exchanger.

As an alternative, the core may be a bundle of tubes through which tubes the first fluid can pass. The inlet/outlet faces 40, 41 of the exchanger are then fitted with header plates into which the tubes emerge in the air inlet and outlet boxes. The second fluid circulates through the body in contact with the tubes.

The body 2 has two open faces which are intended each to correspond with each of the faces 40 and 41 of the exchanger through which faces the stream of feed gas passes, said open faces, respectively referred to as the inlet face and the outlet face of the body 2, being provided facing an open face of the inlet box and of the outlet box.

The body 2 is delimited on one side by a first lateral wall 21 and a second lateral wall 24 on the opposite side of the housing 3 to the first lateral wall. The first lateral wall 21 and the second lateral wall 24 extend in parallel, or substantially parallel, planes.

A first portion, not depicted, of the outlet box extends, for example, from the outlet face of the body 2. This first portion is closed off by an end wall so that it delimits a circulation duct which channels the stream of feed gases toward discharge openings of the air outlet box, said discharge openings being connected to a cylinder head that caps the internal combustion engine.

On the opposite side of the housing 3 that accommodates the heat exchanger from the first portion, the air inlet box comprises a second portion 12, bordered peripherally by a reinforcement 13.

The air inlet box further comprises an intake opening 14 via which the stream of feed gas, notably coming from a compressor or turbocharger, enters an internal volume defined by the walls of the airbox 1. The stream of the gas circulates from the intake opening 14 and toward the heat exchanger 7, defining a direction of circulation or of travel of this stream with respect to the device according to the invention.

It will be noted that the plane in which the intake opening 14 extends is parallel to, and notably coincides with, the plane in which the face 40 of the exchanger that immediately faces the channeling device 6 according to the invention extends, it also being possible to refer to this face as the frontal surface of the exchanger.

The first portion and/or the second portion 12 are, for example, formed as an integral part of the body 2.

The second portion 12 is closed by the channeling device 6 according to the invention. That device thus forms a cover the function of which is to lead or channel the latter toward the face 40 of the exchanger. It will therefore be appreciated that the channeling device 6 faces the exchanger because at least part of this device immediately faces the exchanger 7.

This channeling device 6 is configured to define a central canal 15 and a lateral canal 16 separate from the central canal 15 and through which canals the stream of feed gas circulates.

The central canal 15 is delimited by a first part of a wall 17 of the device. It is intended to channel the stream of gas toward a first zone of one face of the exchanger, notably one situated as close as possible to the intake opening 14. The lateral canal 16 is delimited by a second part of the wall 17. It is intended to channel the stream of gas toward a second zone of said face of the exchanger, notably one situated as far away as possible from the intake opening 14. This then encourages good distribution of the air.

Figure 2:
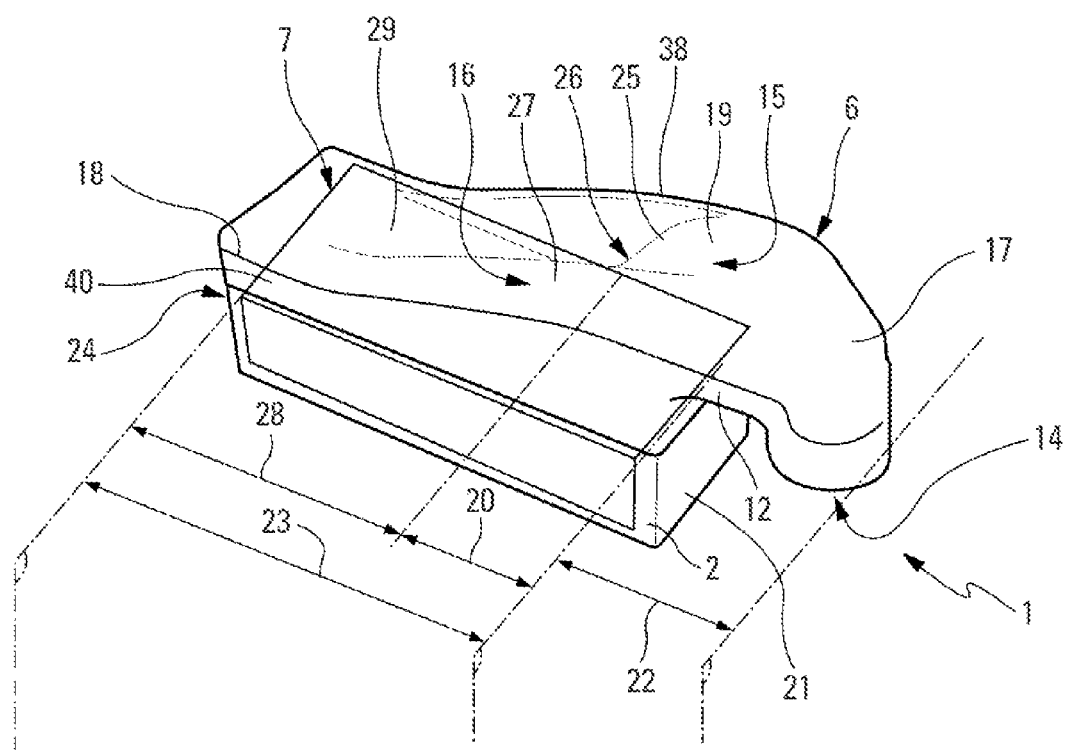
FIG. 2 is a schematic view of the channeling device according to one embodiment of the invention, assembled onto an intake airbox.

FIG. 2 illustrates these canals 15 and 16 in a view of the intake airbox 1 from above. It may be noted that the air outlet box has not been illustrated in this figure.

The wall 17 ends in an edge 18 of a shape that complements the shape of the reinforcement 13 delimiting the second portion 12 of the airbox. This edge 18 thus forms a connecting means extending peripherally at the margins of the wall 17.

The edge 18 delimits two portions of the channeling device 6 which are virtually separated from one another by a plane passing through the first lateral wall 21 of the body 2 which wall is situated between the intake opening 14 and the heat exchanger 7. A first portion is referred to as the inlet section 22 because this is a zone in which the stream of feed gas is in the process of being introduced into the channeling device 6. A second portion is referred to as the outlet section 23 because it corresponds to a portion of the device in which the stream of feed gas is supposed to exit this device. This outlet section 23 is delimited by the plane passing through the first lateral wall 21 and by a plane passing through the second lateral wall 24 of the body 2. In other words, it faces the open face of the air inlet box.

The central canal 15 is delimited or bordered at its bottom by a first part 19 of the wall 17, this first part here being formed by a central portion of the wall along an axis transverse to the device. The first part 19 of the wall 17 is configured to alter the direction of the stream of gas and send it toward a first zone 20 of the frontal face 40 of the heat exchanger 7. This first zone 20 is formed by that surface of the exchanger which is closest to the intake opening 14. This configuration is notably achieved by a first curved zone 25 of the first part 19 of the wall. This first curved zone 25 has its concave side facing toward the outlet section 23, and more precisely toward the first lateral wall 21 of the body 2. In other words, the first curved zone 25 has its concave side facing toward the open face of the air inlet box which is intended to be in register with the inlet face of the body 2.

This first curved zone 25 is, in the direction which the stream of air circulates, in the continuation of the inlet section 22. Considered together, these, for example, take the form of a portion of a cylinder of substantially circular cross section the axis of which notably lies in the plane of the first lateral wall 21 of the body 2 and/or the radius of which is of the order of one fifth of the length of the inlet box.

This first curved zone 25 continues, in the direction in which the stream of air circulates, in a manner immediately adjacent to it, as a second curved zone 26, the curvature of which faces in the opposite direction to the curvature of the first curved zone 25. In other words, the second curved zone 26 has its concave side facing toward the outside of the airbox. Correspondingly, the convex side of the second curved zone 26 thus faces toward the face 40 of the exchanger, or, in other words, toward the outlet section 23.

The first part 19 further comprises a third zone 29 which extends in a plane parallel to at least a portion of the plane of the outlet section 23, this portion in this instance being the portion immediately adjacent to the second lateral wall 24 of the body 2. This third zone 29 is planar and continues the second curved zone 26 in the direction in which the stream of air circulates. In an alternative, the plane in which this third zone 29 extends coincides with the plane of the portion mentioned hereinabove. In other words, it is parallel to the open face of the air inlet box.

The lateral canal 16 is delimited or bordered by a second part 27 of the wall 17 which is distinct from the first part 19 of the wall 17. This second part 27 of the wall 17 laterally borders the device according to the invention. The lateral canal 16 begins at the inlet section 22 substantially in the plane of the first lateral wall 21 forming the body 2 and continues over the entire length of the outlet section 23. Because the central canal 15 also starts in the plane of this first lateral wall 21, it will be appreciated that the central canal 15 and the lateral canal 16 run longitudinally next to one another from this zone.

The second wall 27 is designed to alter the direction of the stream of feed gas and thus send it to a second zone 28 of the face 40 of the exchanger 7, this zone being formed by that part of the plane that passes through the face 40 of the exchanger which is on the opposite side of the first zone 20 of the face 40 of the exchanger from the intake opening 14.

It will be noted that the first wall part 19 is positioned before the second wall part 27 in the direction in which the stream of air circulates. In other words, the first part 19 is upstream of the second part 27, these two parts together forming the wall 17.

Figure 3:
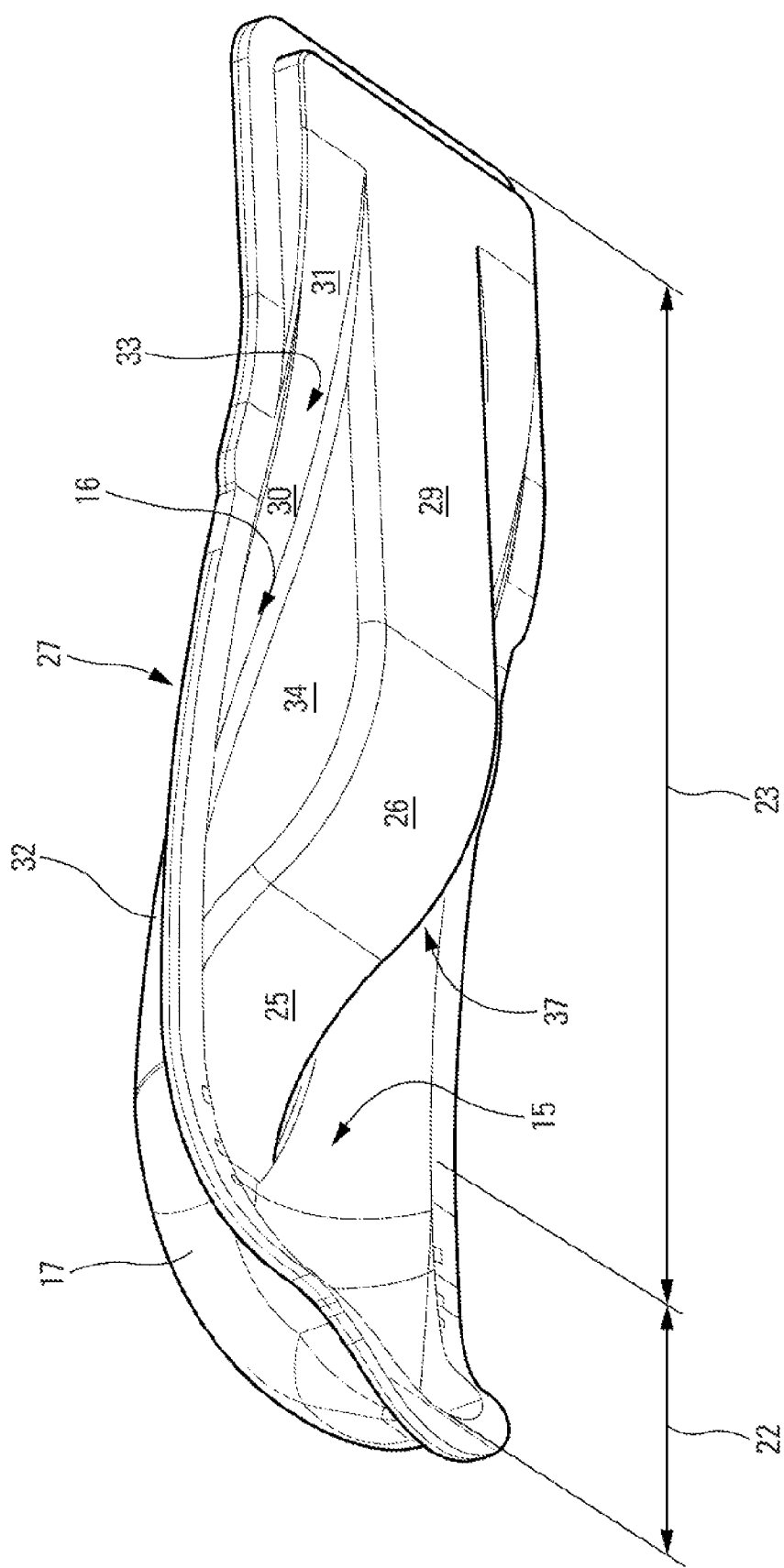
FIG. 3 is a perspective view of one embodiment of the device according to the invention.

FIG. 3 is a perspective view of the channeling device according to the invention. The central canal 15 is delimited by the first part 19 of the wall 17, this first part 19 being formed by the first curved zone 25 followed by the second curved zone 26 at the end of which the straight third zone 29 extends.

The lateral canal 16 is delimited by the second part 27 of the wall 17 and at its bottom has a first curved surface 30 with its concave side facing toward the outlet section 23. This first curved surface 30 is immediately adjacent laterally to the first and second zones 25 and 26 defining the central canal 15. The second part 27 further comprises a second curved surface 31 which extends in the continuation of the first curved surface 30 in the direction in which the stream of air circulates and which has its convex side facing toward the outlet section 23, its concave side thus facing toward the outside of the airbox closed by the device according to the invention. Finally, it will be noted that the second curved surface 31 is immediately adjacent laterally, namely is side by side with, the third zone 29 which forms part of the first part 19 of the wall 17.

The lateral canal 16 is delimited by a first side 32 which extends longitudinally along the device according to the invention. This lateral canal 16 is also delimited by a bottom 33 that makes up the wall 17. Finally, the lateral canal 16 is delimited by a second side 34 that makes up the wall 17, this second side extending from the bottom 33 or, in other words, from the first and second surface 30 and 31 to the first, second and third zones 25, 26 and 29. This first side 32, this bottom 33 and this second side 34 physically embody the second part 27 of the wall 17 which delimits the lateral canal 16.

The channeling device 6 illustrated in FIG. 3 comprises a third canal 37 for the circulation of the stream of gas. This third canal is delimited by a third part (reference 38 in FIG. 2) of the wall 17. This third canal 37 is, for example, configured in exactly the same way as the shape of the lateral canal 16 and reference can be made to the description of the lateral canal 16 to appreciate the construction thereof. In such a situation, the third canal 37 channels the stream of feed gas toward the second zone 28 of the heat exchanger 7.

As an alternative, this third canal 37 may be designed to alter the direction of the stream of feed gas or direct it toward a third zone of the exchanger which zone is distinct from the first zone 20 and distinct from the second zone 28 of the face 40 of the exchanger. It will thus be appreciated that, in this alternative, the third canal 37 is delimited by a wall part 17 which adopts a different shape from the first wall part which defines the central canal 15, and different from the second wall part which defines the lateral canal 16.

In yet another alternative form that is applicable to the two solutions mentioned hereinabove where there are three canals 15, 16 and 37, the central canal 15 extends between the lateral canal 16 and the third canal 37. Thus, the central canal 15 is flanked on one side by the lateral canal 16 and on the other by the third canal 37, at least in the continuation of the first zone 25 that forms the first wall part of the central canal 15.

The channeling device according to the invention is produced as a single unit. It will thus be appreciated that the central canal 15 and the lateral canal 16 are molded simultaneously, in the same mold and from the same material. If the device incorporates a third canal 37, this is produced as a single unit with the first and the lateral canal. It will thus be appreciated that the edge 18, the wall 17 configured to delimit the central canal, the lateral canal and the third canal where present, are formed from the same material and form one and the same single component.

The wall 17 may also have ribs, not depicted, the purpose of which is to mechanically strengthen the wall 17.

It may also be noted that one advantage of the device according to the invention is that it allows the box so equipped to have greater rigidity thanks, in particular, to the sides 34 which in themselves define reinforcing ribs.

The invention is not restricted by the overall form of the channeling device which has been described hereinabove, and any component having a wall able to divide a stream of engine feed gas into two sub-streams and direct them toward distinct zones of a face on an exchanger falls within the scope of the invention.

The invention claimed is:

1. A device for channeling a stream of feed gas for an internal combustion engine, the device capable of being installed at least facing an exchanger for the thermal conditioning of the stream of feed gas, the device comprising:
    an intake inlet section for receiving the stream of feed gas;
    a first canal, referred to as central canal, fluidly communicating directly with the intake inlet section for a circulation of the stream of feed gas, the first canal being delimited by a first part of a wall and intended to channel the stream of feed gas toward a first zone of a face of the exchanger;
    at least one second canal, referred to as a lateral canal, separate from the first canal and fluidly communicating directly with the intake inlet section for the circulation of the stream of feed gas, the at least one second canal being delimited by a second part of the wall and intended to channel the stream of feed gas toward a second zone of the face of the exchanger; and
    a gas stream outlet section;
    wherein the first part of the wall and the second part of the wall are adjacent to one another on a common side of the wall facing toward the gas stream outlet section.

2. The device as claimed in claim 1, in which the first part and the second part are configured to alter a direction of the stream of feed gas, the first part having a profile that differs from that of the second part in a direction of travel of the stream of feed gas.

3. The device as claimed in claim 2, in which the central canal and the lateral canal run side by side, at least in part.

4. The device as claimed in claim 1, in which the central canal and the lateral canal run side by side, at least in part.

5. The device as claimed in claim 1, in which the first part of the wall is formed by a first curved zone with its concave side facing toward the gas stream outlet section and by a second curved zone, situated in the continuation of the first curved zone in a direction in which the stream of feed gas is directed, the second curved zone having its convex side facing toward the gas stream outlet section.

6. The device as claimed in claim 5, in which at least one portion of the gas stream outlet section extends in one plane and in which the first part of the wall comprises a third zone which extends in a plane parallel to the plane of a planar portion of the gas stream outlet section, in the continuation of the second curved zone in the direction in which the stream of feed gas is directed.

7. The device as claimed in claim 6, in which the plane of the third zone coincides with the plane of the planar portion of the gas stream outlet section.

8. The device as claimed in claim 6, in which the second part of the wall has a first curved surface with its concave side facing toward the gas stream outlet section, the first curved surface and the first and second curved zones being side by side.

9. The device as claimed in claim 8, in which the second part of the wall has a second curved surface situated in the continuation of the first curved surface in the direction in which the stream of feed gas circulates and which has its convex side facing toward the gas stream outlet section, the second curved surface and the third zone being side by side.

10. The device as claimed in claim 1, comprising a third canal for the circulation of the stream of feed gas and delimited by a third part of the wall.

11. The device as claimed in claim 10, in which the central canal extends between the lateral canal and the third canal.

12. The device as claimed in claim 11, in which the third canal has a profile identical to that of the lateral canal.

13. An air inlet box of an intake airbox of an internal combustion engine, comprising the device as claimed in claim 1.

14. An intake airbox of an internal combustion engine capable of accepting an exchanger for thermally conditioning the stream of feed gas circulating through the airbox, the airbox comprising the device for channeling the stream of feed gas as claimed in claim 1.

15. The airbox as claimed in claim 14 comprising a body, capable of accepting the exchanger, and a portion formed as an integral part of the body, the portion having an opening which is closed by the device for channeling the stream of feed gas.

16. An air intake module of an internal combustion engine comprising an airbox as claimed in claim 14 and a heat exchanger, provided inside the airbox.

* * * * *